United States Patent [19]

Jones, Jr. et al.

[11] 4,295,536
[45] Oct. 20, 1981

[54] PRESSURE SEAL FOR PUMPING INSTRUMENTS THROUGH DRILL ROD

[75] Inventors: Emrys H. Jones, Jr., Westover, W. Va.; Stephen D. Lauer, Waynesburg, Pa.

[73] Assignee: Conoco Inc., Ponca City, Okla.

[21] Appl. No.: 80,352

[22] Filed: Sep. 28, 1979

[51] Int. Cl.³ .............................................. E21B 47/12
[52] U.S. Cl. .................................. 175/214; 285/9 R; 285/155; 285/373
[58] Field of Search ................... 175/214, 45, 50, 320; 166/84; 285/155, 9 R, 31, 269, 273

[56] References Cited

U.S. PATENT DOCUMENTS

| | | | |
|---|---|---|---|
| 1,646,639 | 10/1927 | Crowell | 166/93 X |
| 1,964,123 | 6/1934 | Kaiser | 285/155 X |
| 3,602,304 | 8/1971 | Mallinger | 166/65 R |
| 3,954,288 | 5/1976 | Smith | 285/373 |
| 4,143,721 | 3/1979 | Zuvela et al. | 175/45 |
| 4,180,092 | 12/1979 | Hunter | 285/31 |

*Primary Examiner*—William F. Pate, III
*Attorney, Agent, or Firm*—Richard W. Collins

[57] ABSTRACT

A device for placement between a rotary drill motor and a drill rod for use in pumping instruments down the drill rod. The device has pressure seals at each end and an opening for an instrument cable which slides through the opening as the instruments are pumped down the drill rod.

2 Claims, 4 Drawing Figures

PRESSURE SEAL FOR PUMPING INSTRUMENTS THROUGH DRILL ROD

BACKGROUND OF THE INVENTION

This invention relates to drilling generally horizontal boreholes in subterranean formations such as coal seams, and more particularly to a device which facilitates pumping a survey probe into a borehole to determine the position of the borehole relative to a coal seam.

Coal seams often contain methane gas in amounts which affect the safety of a mining operation. One method of alleviating the methane gas problem is to drill one or more boreholes into the seam in advance of mining, and to produce gas through the borehole until the methane gas level is low enough to permit safe mining. It is essential in such an operation to maintain the borehole within the coal seam, and techniques have been devised to provide this capability. One such technique utilizes a survey probe which contains instrumentation capable of providing information regarding the borehole position. Such probes are periodically pumped down the interior of the drill rod to a position adjacent the drill bit, readings are taken, and the survey probe is then removed from the drill rod. If necessary, adjustments are made in the drilling operation, based on the information obtained, to maintain the borehole within the coal seam.

Prior to this invention, the placement and removal of the survey probe in and from the drill rod was a time-consuming procedure involving threading a water seal onto a drill motor and utilizing an inconvenient amount of valves and hoses.

SUMMARY OF THE INVENTION

According to the present invention, a device is provided which can be placed between the drill rod and drill motor when a survey probe is to be placed in the drill rod. The device requires no threading of connections and requires no extra valves or hoses.

The device according to the invention comprises a split housing member with a central flow passage and seals at each end. The device further includes a groove from its exterior to the interior flow passage for passage of an instrument cable which is attached to the survey probe.

THE DRAWINGS

DESCRIPTION OF THE PREFERRED EMBODIMENTS

Figure 1:
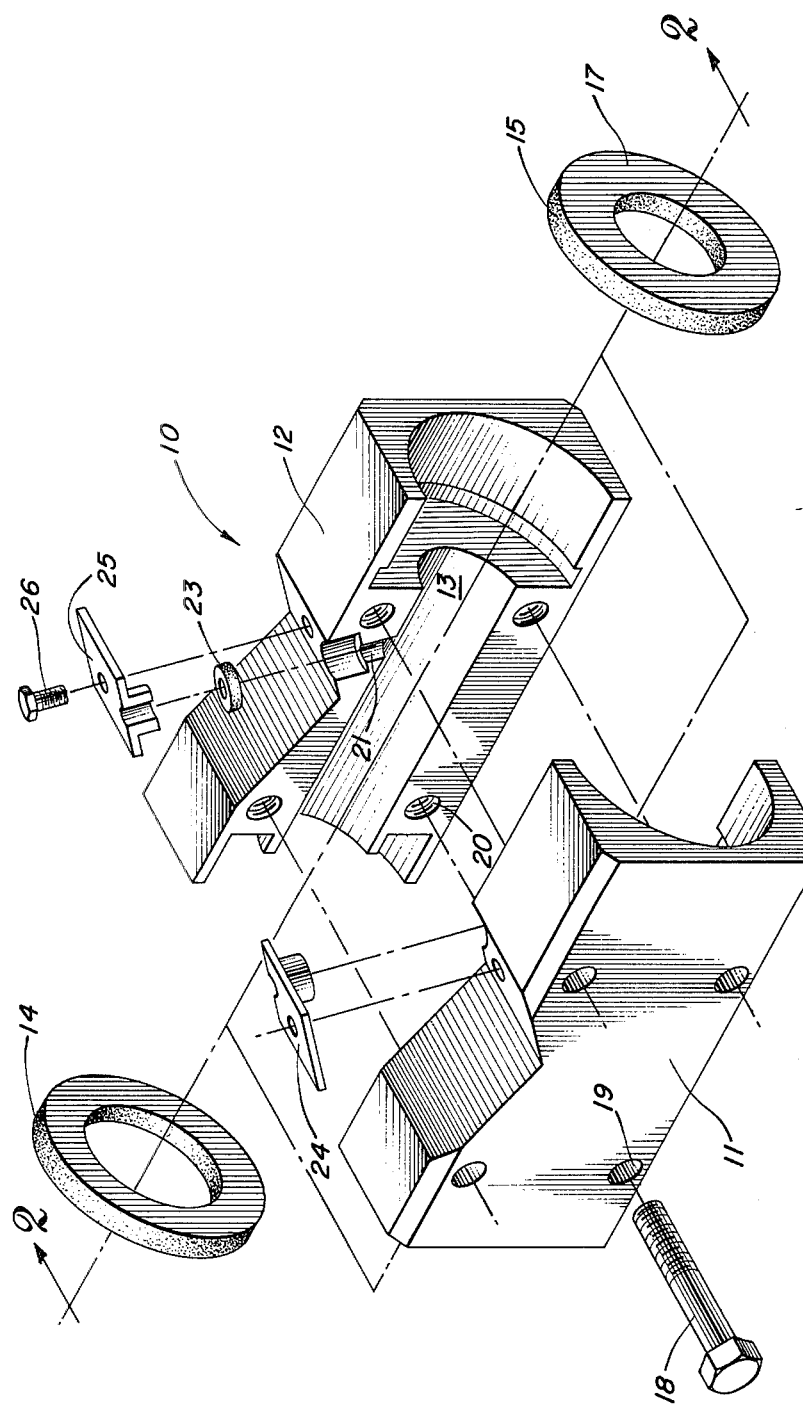
FIG. 1 is an expanded view showing the parts of the sealing device of the invention.
Figure 2:
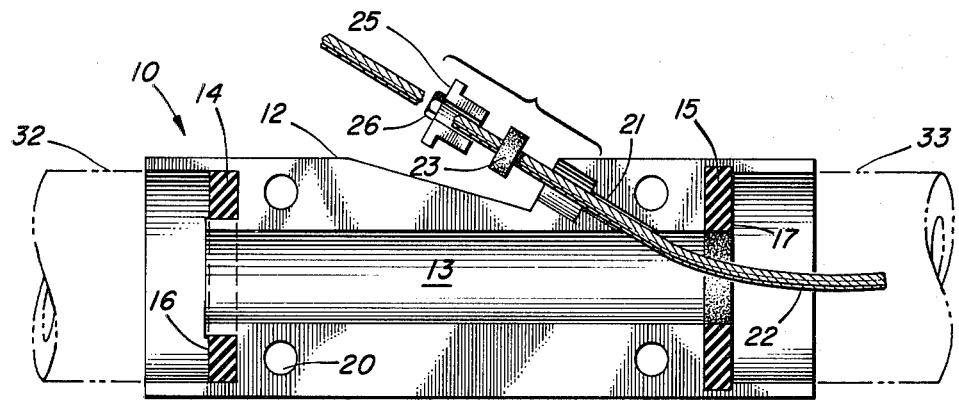
FIG. 2 is a cross section of the sealing device showing a cable extending into the device and showing means for sealing the cable against fluid leakage.

The sealing device according to the preferred embodiment of the invention is shown in detail in FIGS. 1 and 2.

The main body of sealing device 10 is formed of housing half sections 11 and 12. A central flow passage 13 extends longitudinally through the device, and enlarged recessed openings are formed in each end of the device. Compressible sealing washers 14 and 15 in the recessed openings (FIG. 2) provide flat sealing surfaces 16 and 17 so that a seal is provided when the end of a tubular member is pressed against the washers.

The housing half sections 11 and 12 are connected by bolts 18 which extend through unthreaded openings 19 of section 11 into threaded openings 20 of section 12.

An instrument cable entrance opening or bore 21 extends from outside the device 10 to the flow passage 13 at an acute angle, and one half of the bore is formed in each of the housing half sections. This bore 21 is bisected by the connecting plane of the housing sections and is to guide an instrument cable 22 (FIG. 2) from outside the sealing device into the flow passage 13. The exterior end of bore 21 is enlarged to accommodate packing means including a sealing washer 23 and packing gland split members 24 and 25. Packing gland split members 24 and 25 fit snugly in the enlarged part of bore 21 and are pressed into sealing relation with washer 23 (preferably a split washer) by tightening bolts 26 in matching threaded openings in the housing half sections.

Figure 3:
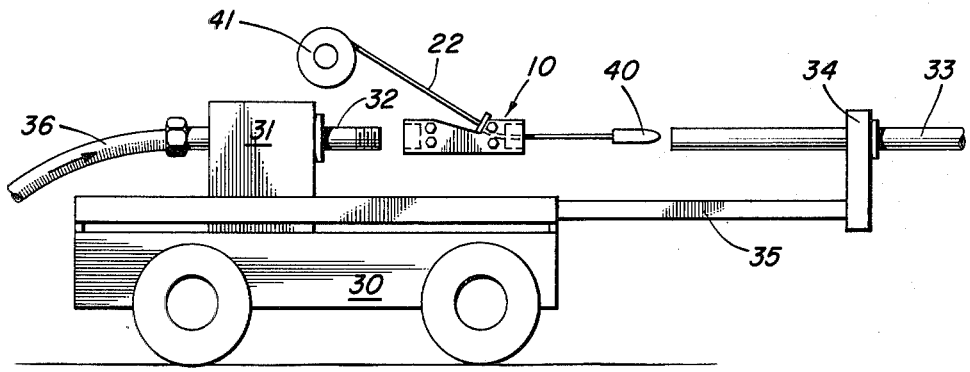
FIG. 3 is a side elevation showing the relationship of the sealing device to a drilling unit as a survey probe is being inserted in the drill rod.
Figure 4:
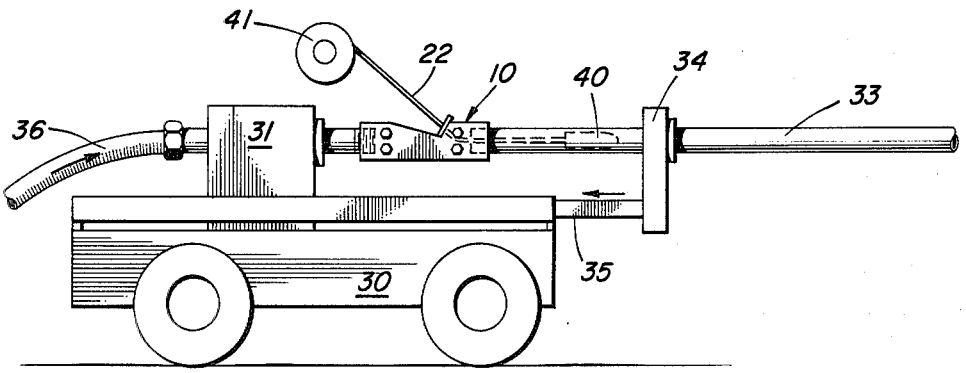
FIG. 4 is a view similar to FIG. 3 showing the sealing device ready for the step of pumping the survey probe down the drill rod.

The drilling equipment which the sealing device of this invention is used with is shown in FIGS. 3 and 4. A mobile vehicle 30 carries a rotary drill motor 31. Rotating pipe section 32 extends from motor 31 and normally threads into drill rod 33 during drilling. Drill rod 33 extends through support member 34 which is mounted on the end of telescoping bar 35 extending from vehicle 30. Hose 36 provides drilling fluid to drill rod 33 during normal drilling operations.

OPERATION

When it is desired to determine the relationship of a borehole in a coal seam which is being drilled, the drilling operation is stopped. The flow of drilling fluid from hose 36 is shut off, and drill rod 33 is unthreaded from pipe 32 extending from motor 31.

As best seen in FIG. 2, cable 22 is placed between split housing sections 11 and 12 into bore 21, and cable washer 23 is placed over cable 22 and inserted into the enlarged outer portion of bore 21. Split packing gland members 24 and 25 are inserted into the enlarged portion of bore 21 and bolts 26 are tightened to seal cable washer 23 against cable 22. Housing sections 11 and 12 are joined by bolts 18, completing assembly of the sealing device.

A survey probe 40 attached to one end of cable 22 is positioned for insertion in drill rod 33 (FIG. 3). Drill rod 33 is then pulled back toward rotary motor 31 by movement of telescoping bar 35 and drill rod support 34 (FIG. 4). Telescoping bar 35 is moved to the left as seen in FIG. 4 until both drill rod 33 and pipe section 32 are compressed against the flat surfaces 16 and 17 of sealing washers 14 and 15 (FIG. 2). The probe is then ready to be pumped down drill rod 33 into position to determine the relationship of the borehole to the coal seam (not shown).

Drilling fluid is pumped from hose 36 through pipe section 32, sealing device 10, and into drill rod 33 behind probe 40. As fluid is pumped, probe 40 is forced through drill rod 33, pulling cable 22 from cable reel 41 through sealing device 10. After probe 40 reaches the end of drill rod 33, the pump is stopped, and measurements are made to determine the borehole-coal seam relationship.

After the measurements are completed, the probe is retrieved by rewinding cable 22 on cable reel 41. When the probe reaches sealing device 10, the drill rod is moved away by moving telescoping bar 35 to the position shown in FIG. 3. Sealing device 10 and probe 40 are then set aside and pipe 32 is again threaded onto drill rod 33. Normal drilling is resumed with adjustments as indicated by the measurements obtained. After a predetermined amount of additional drilling, the procedure is repeated.

The procedure described above minimizes the time for taking measurements, thus increasing drilling efficiency.

We claim:

1. In a system for taking surveys of borehole conditions in a generally horizontal borehole being drilled, said system comprising a drill rod, a survey probe in the drill rod adapted to be pumped through the drill rod and retrieved by reeling in a cable attached to the probe, a pump for pumping fluid through the drill rod to force the survey probe therethrough, a rotary motor between the pump and the drill rod, and a pipe extending from the rotary motor in alignment with the drill string;

the improvement wherein a sealing device positioned between said pipe and said drill rod is provided, said sealing device comprising:

(a) a housing having a central flow passage therethrough and an enlarged recessed opening in each end therethrough, said housing being of split construction and having two half sections;

(b) a first seal in one end of said housing adapted to sealingly engage said drill rod when pressed thereagainst;

(c) a second seal in the other end of said housing adapted to sealingly engage said pipe when pressed thereagainst;

(d) an instrument cable entrance opening extending from outside said housing to said flow passage, said opening being bisected by the connecting plane of said two half sections, said opening being at an acute angle with respect to said flow passage; and (e) packing means in said opening allowing movement of an instrument cable therethrough and preventing leakage therefrom.

2. A sealing device comprising:

(a) a housing having an axial flow passage therethrough and an enlarged recessed opening in each end thereof, said housing being split along its longitudinal axis and formed of two half sections joined together;

(b) a sealing gasket in said recessed opening at each end of said housing adapted to sealingly engage a pipe pressed thereagainst in alignment with said flow passage;

(c) a bore through said housing in fluid communication with said flow passage and at an acute angle therewith, said bore being partially formed in each of said half members; and (d) packing means in said bore for sealingly engaging a cable extending therethrough.

* * * * *